(12) United States Patent
Satish et al.

(10) Patent No.: US 8,401,982 B1
(45) Date of Patent: Mar. 19, 2013

(54) USING SEQUENCING AND TIMING INFORMATION OF BEHAVIOR EVENTS IN MACHINE LEARNING TO DETECT MALWARE

(75) Inventors: Sourabh Satish, Fremont, CA (US); Zulfikar Ramzan, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 570 days.

(21) Appl. No.: 12/687,767

(22) Filed: Jan. 14, 2010

(51) Int. Cl.
*G06F 11/00* (2006.01)
*G06F 15/18* (2006.01)

(52) U.S. Cl. ............... 706/20; 706/12; 726/22
(58) Field of Classification Search .................. None
See application file for complete search history.

(56) References Cited

U.S. PATENT DOCUMENTS 7,809,670 B2 * 10/2010 Lee et al. ................. 706/59

OTHER PUBLICATIONS

Dietterich, T.G., "Machine Learning for Sequential Data: A Review," Structural, Syntactic, and Statistical Pattern Recognition, 2002, Springer, pp. 1-15 [Online] [Retrieved on Jun. 1, 2010] Retrieved from the Internet<URL:http://web.engr.oregonstate.edu/~tgd/publications/mlsd-ssspr.pdf>.

* cited by examiner

*Primary Examiner* — Alan Chen
(74) *Attorney, Agent, or Firm* — Fenwick & West LLP

(57) ABSTRACT

A decision tree for classifying computer files is constructed. A set of training files known to be legitimate or malicious are executed and their runtime behaviors are monitored. When a behavior event is detected for one of the training file at a point in time, a feature vector is generated for that training file. Behavior sequencing and timing information for the training file at that point in time is identified and encoded in the feature vector. Feature vectors for each of the training files at various points in time are fed into a decision tree induction algorithm to construct a decision tree that takes into account of the sequencing and timing information.

19 Claims, 6 Drawing Sheets

USING SEQUENCING AND TIMING INFORMATION OF BEHAVIOR EVENTS IN MACHINE LEARNING TO DETECT MALWARE

BACKGROUND

1. Field of Disclosure

The disclosure generally relates to the field of computer science, in particular to machine learning for purposes including identifying rules for detecting malicious software.

2. Description of the Related Art

A wide variety of malicious software (malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware. Accordingly, there is a need for techniques that can reliably detect malware by examining behavior information.

SUMMARY

Embodiments of the present disclosure include methods (and corresponding systems and computer program products) for constructing a classifier for classifying computer files that takes into account behavior sequencing and timing information of the computer files.

One aspect of the present disclosure is a computer-implemented method for constructing a classifier for classifying computer files that takes into account behavior sequencing and timing information of the computer files, comprising: monitoring runtime behavior of a training file of a known classification; detecting a plurality of behavior events exhibited by the training file, the plurality of behavior events detected at ones of a plurality of points in time; responsive to detecting the plurality of behavior events at ones of the plurality of points in time, identifying (1) an event sequence exhibited by the training file reflecting the runtime behavior at the point in time and (2) a time gap between the point in time and a point in time when an adjacent behavior event is detected; generating, for each of the plurality of behavior events, a feature vector encoded with information related to the training file at a point in time the associated behavior event is detected, the related information comprising values of a predetermined set of file attributes, an exhibited event sequence, and a time gap; constructing a classifier based on the feature vectors and the known classification of the training file; and storing the classifier.

Another aspect of the present disclosure is a computer system for constructing a classifier for classifying computer files that takes into account behavior sequencing and timing information of the computer files, comprising: a non-transitory computer-readable storage medium storing executable computer program code comprising: a feature determination module for monitoring runtime behavior of a training file of a known classification, detecting a plurality of behavior events exhibited by the training file, the plurality of behavior events detected at ones of a plurality of points in time, identifying (1) an event sequence exhibited by the training file reflecting the runtime behavior at the point in time and (2) a time gap between the point in time and a point in time when an adjacent behavior event is detected in response to detecting the plurality of behavior events at ones of the plurality of points in time, and generating, for each of the plurality of behavior events, a feature vector encoded with information related to the training file at a point in time the associated behavior event is detected, the related information comprising values of a predetermined set of file attributes, an exhibited event sequence, and a time gap; a machine learning engine for constructing a classifier based on the feature vectors and the known classification of the training file; and a data store for storing the classifier.

Still another aspect of the present disclosure is a non-transitory computer-readable storage medium encoded with executable computer program code for constructing a classifier for classifying computer files that takes into account behavior sequencing and timing information of the computer files, the computer program code comprising program code for: monitoring runtime behavior of a training file of a known classification; detecting a plurality of behavior events exhibited by the training file, the plurality of behavior events detected at ones of a plurality of points in time; responsive to detecting the plurality of behavior events at ones of the plurality of points in time, identifying (1) an event sequence exhibited by the training file reflecting the runtime behavior at the point in time and (2) a time gap between the point in time and a point in time when an adjacent behavior event is detected; generating, for each of the plurality of behavior events, a feature vector encoded with information related to the training file at a point in time the associated behavior event is detected, the related information comprising values of a predetermined set of file attributes, an exhibited event sequence, and a time gap; constructing a classifier based on the feature vectors and the known classification of the training file; and storing the classifier.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
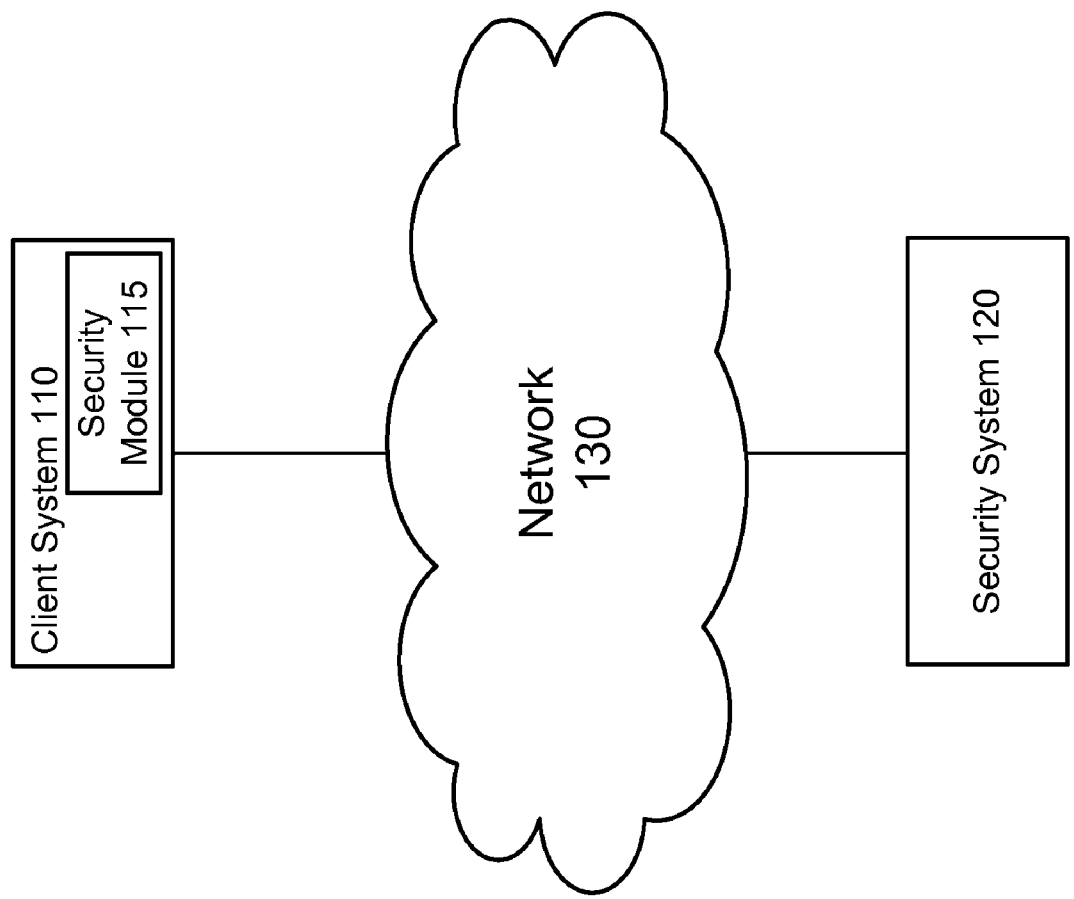
FIG. 1 is a high-level block diagram of a computing environment according to one embodiment of the present disclosure.

FIG. 1 is a high-level block diagram that illustrates a computing environment 100 for constructing a classifier (e.g., a decision tree) taking into account behavior sequencing and timing information, and using the classifier to detect malicious software, according to one embodiment of the present disclosure. For purposes of discussion, a decision tree will be used as an example classifier in the following description. One of ordinary skill in the art will recognize that other machine learning classifiers such as Support Vector Machines, Perceptrons, Neural Networks, Naïve Bayes classifiers, Random Forests, can be similarly used. As shown, the computing environment 100 includes a client system 110 and a security system 120 connected through a network 130. Only one of each entity is illustrated in order to simplify and clarify the present description. There can be other entities in the computing environment 100 as well.

The client system 110 is an electronic device that can host malicious software. In one embodiment, the client system 110 is a conventional computer system executing, for example, a Microsoft Windows-compatible operating system (OS), Apple OS X, and/or a Linux distribution. In another embodiment, the client system 110 is another device having computer functionality, such as a personal digital assistant (PDA), mobile telephone, video game system, etc. The client system 110 typically stores numerous computer files that can host malicious software.

Malicious software, sometimes called "malware," is generally defined as software that executes on the client system 110 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

The client system 110 executes a security module 115 for detecting the presence of malware. The security module 115 can be, for example, incorporated into the OS of the computer or part of a separate comprehensive security package. In one embodiment, the security module 115 is provided by the entity that operates the security system 120. The security module 115 can communicate with the security system 120 via the network 130 for classification logic (e.g., a decision tree) for determining whether a file is malware.

The security module 115 determines whether a file is malicious by applying the classification logic such as a decision tree. A decision tree is a classifier in the form of a tree structure that includes branch nodes and leaf nodes. Each branch node specifies an attribute (splitting attribute) and a test (splitting test) to be carried out on the value of the splitting attribute, and branches out to other nodes for all possible outcomes of the splitting test. The branch node that is the root of the decision tree is called the root node. Each leaf node represents a classification (e.g., whether a file is malware or legitimate). The leaf nodes can also contain additional information about the represented classification such as a confidence score that measures a confidence in the represented classification (i.e., the likelihood of the classification being accurate). For example, the confidence score can be a continuous value ranging from 0 to 1, which a score of 0 indicating a very low confidence (e.g., the indication value of the represented classification is very low) and a score of 1 indicating a very high confidence (e.g., the represented classification is almost certainly accurate). A file can be classified by traversing down the decision tree based on outcomes of the splitting tests of the branch nodes on the path until a leaf node is reached, which provides a classification of the file. The decision tree can be received from the security system 120.

The security system 120 is a hardware device and/or software program configured to construct (or induce) a decision tree for deciding whether a file is malware, and provide the constructed decision tree to the client systems 110. An example of the security system 120 is a web-based system providing security software and services allowing the security module 115 to detect and remediate malware on the client systems 110.

The security system 120 constructs the decision tree based on behaviors and attributes of a set of training files (called the training corpus) known to be legitimate or malicious. For each file in the training corpus, the security system 120 executes the file (e.g., in a virtual machine) and monitors its runtime behavior, and analyzes the file (e.g., its metadata, system properties) for its attributes. In one embodiment, the security system 120 monitors the runtime behavior by detecting a few behavior events (also called behavioral events) that correspond to a predetermined set of OS activities known to be helpful in separating legitimate software from malware. Examples of such OS activities include file create, file write, file delete, registry modify, registry delete, process launch, process terminate (or exit), thread create, and thread terminate. By limiting the monitoring scope to a small set of OS activities, the security system 120 effectively detects relevant behavior events without consuming substantial computational resources. Examples of the attributes include the existence of a digital signature and the source of the training file. The security system 120 constructs the decision tree by applying a decision tree induction algorithm (e.g., C4.5 algorithm or C5.0 algorithm) to the attribute values and behavior-related data (e.g., event type, sequence, and timing).

The behavior-related data the security system 120 feeds into the decision tree induction algorithm include event sequencing and timing information. It is observed that malicious software and legitimate software behave differently in the sequencing aspect and the timing aspect. For example, most malware perform many behavior events in a very short span of time, which is only natural since they want to take the first opportunity to completely infect the machine and become a persistent part of it. On the other hand, most legitimate software would not exhibit such behavior events in similar short span of time, and/or in a different order. Thus, the behavior events exhibited by a computer file (or its process), including event sequencing and timing information, can help to accurately classify the file. As a result, by feeding such information to the decision tree induction algorithm, the security system 120 can construct a better decision tree that takes into account of such sequencing and timing information.

The network 130 enables communications between the client system 110 and the security system 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
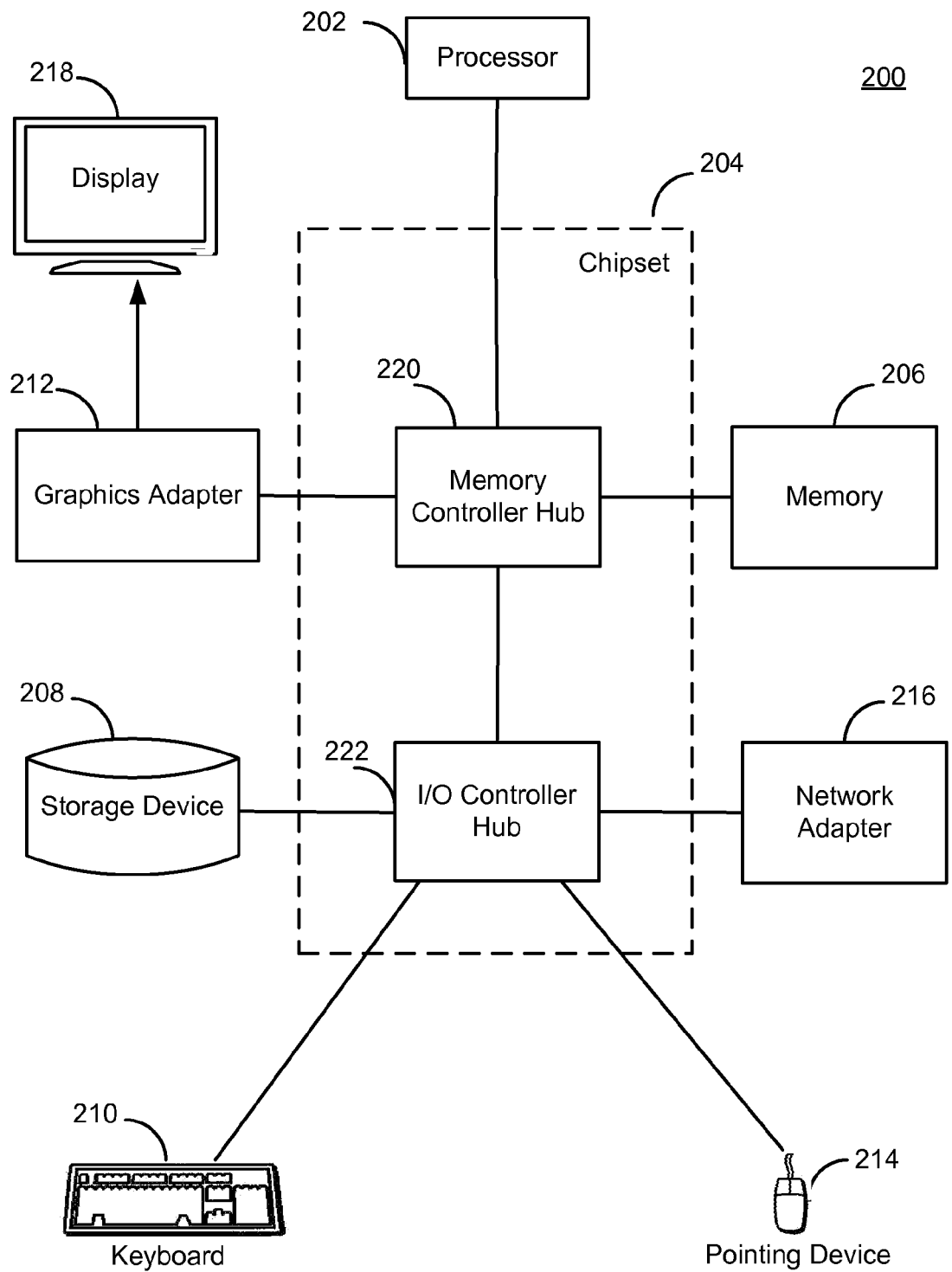
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the security system 120 might comprise multiple blade servers working together to provide the functionality described herein. As another example, the client system 110 might comprise a mobile telephone with limited processing power. The computers 200 can lack some of the components described above, such as keyboards 210, graphics adapters 212, and displays 218.

Example Architectural Overview of the Security Module

Figure 3:
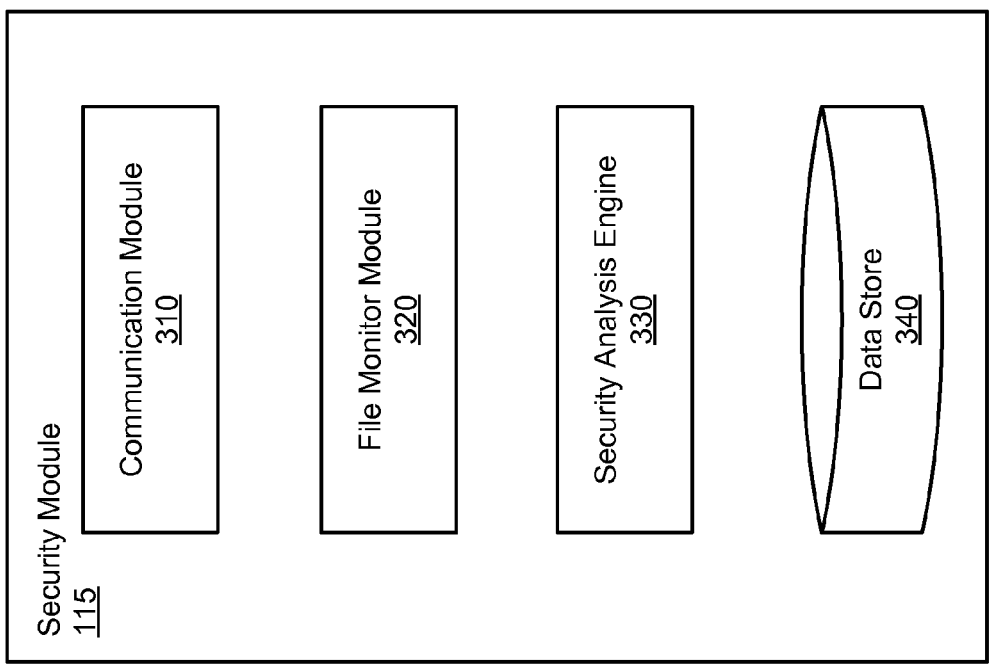
FIG. 3 is a high-level block diagram illustrating modules within a security module according to one embodiment of the present disclosure.

FIG. 3 is a high-level block diagram illustrating a detailed view of modules within the security module 115 according to one embodiment. Some embodiments of the security module 115 have different and/or other modules than the ones described herein. Similarly, the functions can be distributed among the modules in accordance with other embodiments in a different manner than is described here. As illustrated, the security module 115 includes a communication module 310, a file monitor module 320, a security analysis engine 330, and a data store 340.

The communication module 310 communicates with the security system 120 to request and receive a decision tree for detecting malware. The decision tree can be received in a variety of forms, such as a set of rules (e.g., if-then-else statements) derived from the decision tree, a computer program module implementing the decision tree, textual description of the decision tree in an XML file, or any ASCII file format. In addition to the decision tree, the communication module 310 also receives information specifying features used in the decision tree. Examples of such information include event types, event sequencing information, and event timing information used by the decision tree, and normalization rules to be applied to feature values (e.g., rounding a time gap to a specific unit of time such as millisecond).

The file monitor module 320 monitors computer files within the client system 110 and collects information related to the file attributes and behavior events used in the decision tree (called attributes of interest and events of interest, respectively). The file monitor module 320 examines a computer file (e.g., system properties, metadata) to determine values of file attributes such as whether the file is digitally signed. The file monitor module 320 also monitors the runtime behavior of the file (or its process) to detect the occurrence of events of interest. The file monitor module 320 passes values of the attributes of interest and data related to the exhibited events of interest (e.g., event type, sequence, and timing) to the security analysis engine 330 to determine whether the file is malware.

The security analysis engine 330 determines whether a computer file is malicious by traversing down the decision tree according to values of the splitting attributes of the branch nodes on the path. In one embodiment, the security analysis engine 330 makes the determination for a file when an event of interest (e.g., an attempt to write to the system registry) is detected for that file. Starting from the root node of the decision tree, the security analysis engine 330 repeatedly determines the value of the splitting attribute for the file, and determines the branch to take for the branch node until a leaf node is reached. The security analysis engine 330 makes the determination based on the classification represented by the leaf node. The security analysis engine 330 determines the value of the splitting attribute based on information received from the file monitor module 320. In one embodiment, the security analysis engine 330 also considers other factors such as the confidence score for the represented classification and the local security policy in making the determination.

The data store 340 stores data used by the client system 110. Examples of such data include information related to the computer files residing on the client system 110 (e.g., values of attributes of interest, behavior related data, metadata, system properties), the decision tree, and information about the security system 120 (e.g., IP address). The data store 340 may be a relational database or any other type of database.

Example Architectural Overview of the Security System

Figure 4:
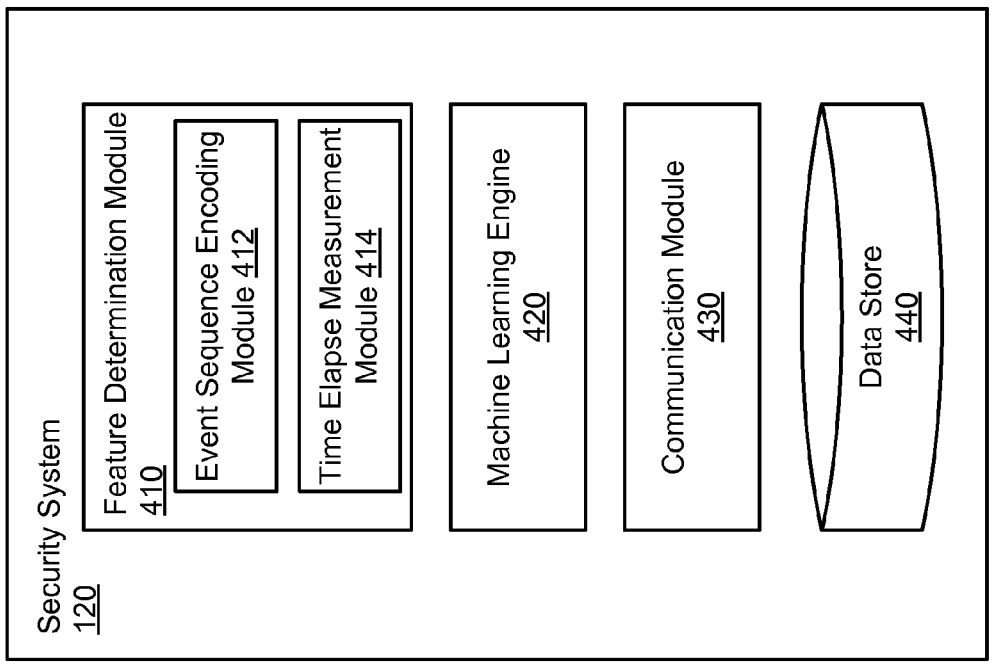
FIG. 4 is a high-level block diagram illustrating modules within a security system according to one embodiment of the present disclosure.

FIG. 4 is a high-level block diagram illustrating a detailed view of modules within the security system 120 according to one embodiment. Some embodiments of the security system 120 have different and/or other modules than the ones described herein. Similarly, the functions can be distributed among the modules in accordance with other embodiments in a different manner than is described here. As illustrated, the security system 120 includes a feature determination module 410, a machine learning engine 420, a communication module 430, and a data store 440.

The feature determination module 410 monitors a set of training files (the training corpus) known to be legitimate or malicious and determines values of a set of features for the training files. Examples of the features include behavior events, event sequence, event timing, and file attributes. For each file in the training corpus, the feature determination module 410 analyzes the file (e.g., its metadata, system properties) to determine values of the file attributes, and executes the file (e.g., in a virtual machine) to detect a set of behavior events. An instance of a running file is commonly referred to as a process. In the following description of runtime behavior, the term "file" and the term "process" are used interchangeably.

A behavior event corresponds to an OS activity performed by a process. When a behavior event is detected in a process, the feature determination module 410 generates a feature vector including file attribute values and behavior event data at that point in time, and associates the feature vector with a label indicating the classification of the corresponding training file (e.g., legitimate or malicious). Example features in the feature vector include a current event feature designated to capture the current behavior event (e.g., its event type), an event timing feature designated to capture a timing aspect of behavior events exhibited by the process, and one or more event sequencing features designated to capture a sequencing aspect of the exhibited behavior events. Thus, starting from process launch and until process exit, the feature determination module 410 creates a series of feature vectors for each training file, one for each detected behavior event.

In one embodiment, the feature determination module 410 monitors each thread of a process individually, and generates feature vectors on a per-thread basis. A process may have multiple threads of execution, each of which may exhibit behavior events. Threading scenarios are OS and runtime dependent, thus events happening in one thread may not correlate with events observed in other threads of the same process. In order to accurately capture the behavior sequences of a multithread process, the feature determination module 410 treats every thread as an independent source of events, and generates feature vectors for every thread. In one embodiment, the feature determination module 410 leverages Thread Local Storage (TLS) to store observed behavior information of different threads.

As shown, the feature determination module 410 includes an event sequence encoding module 412 and a time elapse measurement module 414. The event sequence encoding module 412 encodes sequences of behavior events in event sequencing features. In one embodiment, there is an event sequencing feature for each event type in the feature vector, and the value of one such feature is the order (or sequence number) of a detected behavior event of that event type. For example, assume the feature determination module 410 tracks the following four types of behavior events: file create, file write, process launch, and registry modify. After executing a particular training file, the feature determination module 410 detects the launch of a corresponding process at time $t_0$, a file creation event at time $t_1$, a file write event at $t_2$, and a registry modification event at $t_3$. Accordingly, the event sequence encoding module 412 encodes the event sequencing information at these points in time in the following four series of feature vectors for the four points in time (i.e., $t_0, t_1, t_2, t_3$):

$\{-1, -1, 0, -1, \ldots\}_{t_0}$,
$\{1, -1, 0, -1, \ldots\}_{t_1}$,
$\{1, 2, 0, -1, \ldots\}_{t_2}$,
$\{1, 2, 0, 3, \ldots\}_{t_3}$, where the first four features in the feature vectors are event sequencing features corresponding to file create event type, file write event type, process launch event type, and registry modify event type, in that order. The other features in the feature vectors are omitted for clarity. The value $-1$ indicates that no behavior event of the corresponding event type has been detected yet. As shown, in the feature vector generated at time $t_0$, the feature value of the event sequencing feature for the process launch event type is set as 0 and values for the other event sequencing features are all $-1$, indicating that a process launch event is detected first and no other types of event is detected at time $t_0$. Similarly, in each of the subsequent feature vectors, the values of the event sequencing features are the orders (or sequence numbers) in which behavior events of the corresponding event types were first observed at that points in time.

In another embodiment, instead of or in addition to encoding the sequencing number of a behavior event in a feature vector, the event sequence encoding module 412 encodes the event type (e.g., an enumerated type) of the preceding behavior event (or adjacent behavior event). Using the above event sequence as an example, the event sequence encoding module 412 would encode the event sequencing information as follows:

$\{-1, -1, \text{enum\_none}, -1, \ldots\}_{t_0}$,
$\{\text{enum\_process\_launch}, -1, \text{enum\_none}, -1, \ldots\}_{t_1}$,
$\{\text{enum\_process\_launch}, \text{enum\_file\_create}, \text{enum\_none}, -1, \ldots\}_{t_2}$,
$\{\text{enum\_process\_launch}, \text{enum\_file\_create}, \text{enum\_none}, \text{enum\_file\_write}, \ldots\}_{t_3}$, where the value $-1$ indicates that the corresponding behavior event has not been detected yet, and the value enum_none is introduced to indicate a lack of preceding event. As shown, unlike the previous embodiment, which encodes event sequence numbers and thus captures an absolute sequencing aspect, the present embodiment encodes the preceding event type and thus captures a relative sequencing aspect.

The time elapse measurement module 414 encodes observed timing of behavior events in the event timing feature. In one embodiment, the time elapse measurement module 414 identifies the time gap between the current event and the preceding event, and encodes the time gap in the event timing feature. In another embodiment, the time elapse measurement module 414 encodes the time elapsed since the process launch (or thread creation). The time elapse measurement module 414 may normalize the duration of the time (e.g., round off to the nearest millisecond) before assigning the normalized value to the event timing feature.

The machine learning engine 420 constructs a decision tree by applying a decision tree induction algorithm (e.g., C4.5 algorithm or C5.0 algorithm) to the feature vectors of the training corpus determined by the feature determination module 410. By applying the algorithm, the machine learning engine 420 learns to find out the best means of classifying a training file as legitimate or malicious on the basis of the feature vectors. Because the feature vectors are encoded with event sequencing and timing information, the machine learning engine 420 determines whether and what event timing and/or sequencing information (e.g., a specific event pair) can be used to render improved classification, and includes it in the final decision tree. Thus, when the final decision tree is applied to runtime events of a new process, behavior or event timing and sequencing information will automatically be leveraged by the decision tree to produce more accurate classifications.

The communication module 430 receives requests from the security modules 115 running on the client systems 110 and provides the constructed decision tree along with information specifying features used therein to the security modules 115. The decision tree can be used in the security module 115 for general purpose malware detection.

The data store 440 stores data used by the security system 120. Examples of such data include the set of training files and associated feature vectors, the constructed decision tree and associated information (e.g., splitting attributes, splitting tests), and client systems 110, to name a few. Similar to the data store 340, the data store 440 may be a relational database or any other type of database.

Overview of Methodology for the Security System

Figure 5:
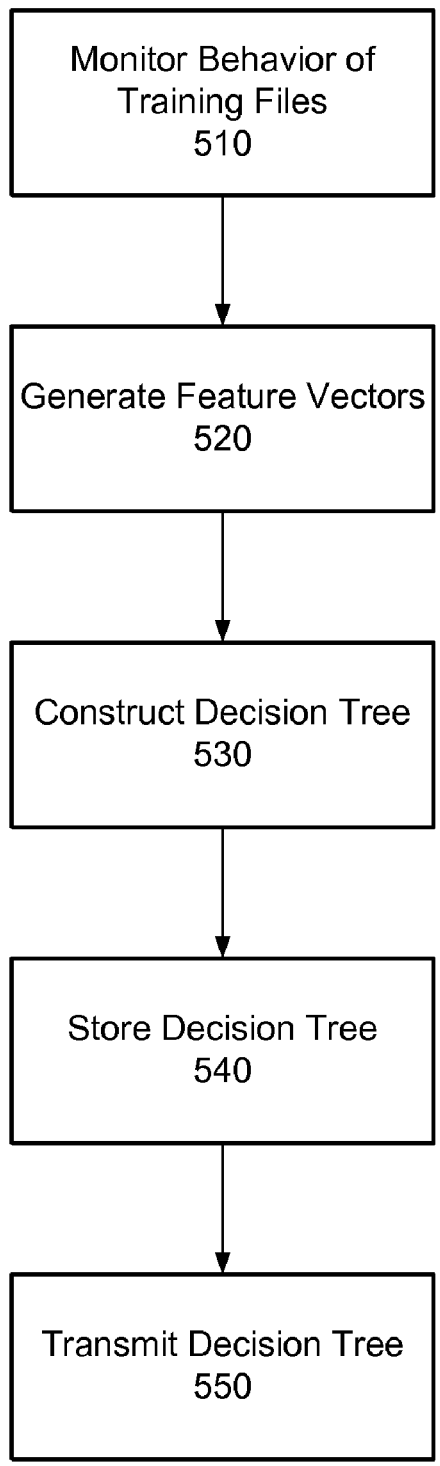
FIGS. 5 and 6 are flow diagrams collectively illustrating a process for constructing a decision tree that takes into account behavior sequencing and timing information according to one embodiment of the present disclosure.

FIG. 5 is a flow diagram illustrating a process 500 for the security system 120 to construct a decision tree that takes into account behavior sequencing and timing information, according to one embodiment. Other embodiments can include different and/or additional steps than the ones described herein. Moreover, other embodiments can include different and/or additional steps than the ones described herein.

The security system 120 monitors 510 the runtime behavior of a set of training files (the training corpus) with known classification (e.g., legitimate or malicious), and generates 520 feature vectors for each of the training files. Each feature vector includes values of a predetermined set of candidate attributes of the associated training file (the file attributes). In addition, each feature vector is encoded with timing and sequencing information associated with a distinctive behavior event exhibited by the associated training file at a particular point in time. A behavior event is an event of an event type that corresponds to a type of OS activity known to be helpful in separating legitimate software from malware. Example event types include file create, file write, file delete, registry modify, registry delete, process launch, process terminate (or exit), thread create, and thread terminate, to name a few. The monitor step 510 and generate step 520 are illustrated in FIG. 6 and described in detail below.

Figure 6:
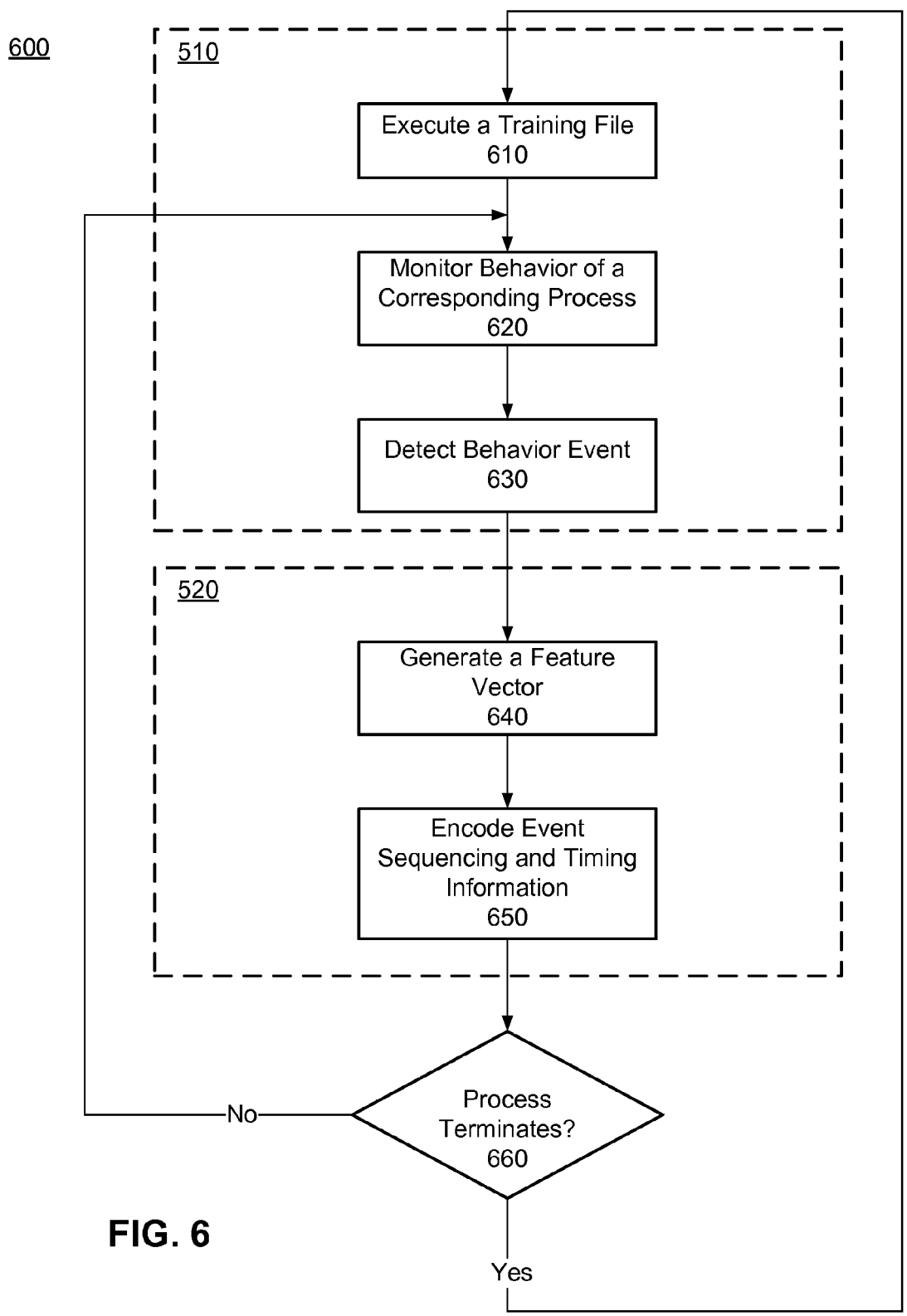

Referring now to FIG. 6, a flow diagram illustrating a process 600 for the security system 120 to monitor 510 the runtime behavior of a training file and generate 520 a feature vector when the training file exhibits a behavior event, according to one embodiment. As shown, the security system 120 initially executes 610 the training file (e.g., in a virtual machine) and monitors 620 the runtime behavior of a corresponding process created by executing the training file.

The security system 120 detects 630 a behavior event exhibited by the monitored process. As a result of the detection 630, the security system 120 generates 640 a feature vector and encodes 650 event sequencing and timing information of the process at that point in time into the feature vector. For example, for each event type, the security system 120 may encode the sequence number of an observed behavior event of that event type and/or the event type of the preceding behavior event. The timing information may be the time gap between the current event and the preceding event, or the time elapsed since the process launch (or thread creation).

The security system 120 determines 660 whether the process terminates (e.g., whether the current behavior event is a process exit event). If the process is not terminated, the security system 120 continues monitoring 620 the process. Otherwise, if the process is terminated, the security system 120 can move on to the next training file, or, if all training files are processed, construct 530 a decision tree. In one embodiment, if a process forks into multiple threads, each of the threads is monitored separately as independent source of events, and the security system 120 generates feature vectors for every thread.

Referring back to FIG. 5, the security system 120 constructs 530 a decision tree by applying a decision tree induction algorithm (e.g., C4.5 algorithm or C5.0 algorithm) to the feature vectors. In one embodiment, the security system 120 associates a label with the feature vectors indicating the classification of the associated training file before feeding the feature vectors into the decision tree induction algorithm. The security system 120 stores 540 the decision tree, and also transmits 550 the decision tree to the client system 110 (e.g., upon demand).

The process 500 beneficially introduces behavior sequencing and timing aspects into the decision tree induction algorithm. As a result, the security system 120 discovers the event sequencing/timing information that turn out to be important to classify the training corpus, and thus generates a more effective decision tree. For example, the security system 120 may discover that the time gap between a file delete and a preceding registry modification is a good indicator that can help to classify a training file as legitimate or malicious, and include the corresponding features in the decision tree. One embodiment of the process 500 is tested on a sample training corpus. The output decision tree does indeed use the event timing feature and event sequencing features as splitting attributes.

Overview of Methodology for the Security Module

Figure 7:
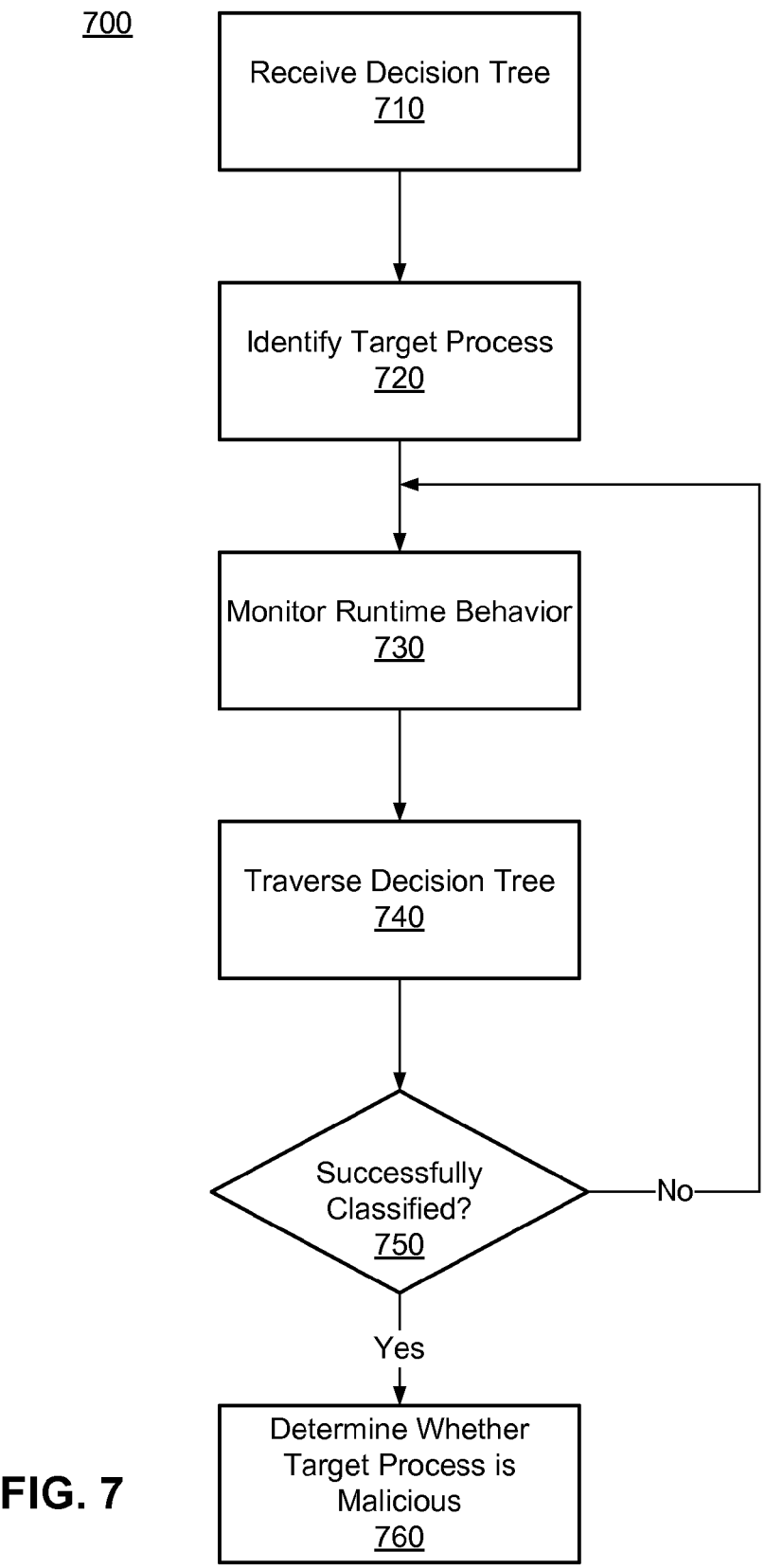
FIG. 7 is a flow diagram illustrating a process for using a decision tree to detect malware according to one embodiment of the present disclosure.

FIG. 7 is a flow diagram illustrating a process 700 for the security module 115 to detect malware by monitoring runtime behavior of local processes and traversing a decision tree using the sequential/timing event information, according to one embodiment. Other embodiments can perform the steps of the process 700 in different orders.

Initially, the security module 115 running on the client system 110 receives 710 a decision tree from the security system 120 via the network 130. The security module 115 identifies 720 a target process for security scrutiny. For example, the security module 115 monitors processes launched in the client system 110, identifies a newly launched process that is associated with an unknown computer file (e.g., a file not yet classified by the security module 115, also called the target file), and identifies 720 that process as the target process for security scrutiny.

The security module 115 monitors 730 the runtime behavior of the target process to identify event sequencing and/or timing information that is used in the decision tree. Whenever an event of interest is detected, the security module 115 generates a feature vector including the identified sequencing/timing information and attribute values of the associated target file. The security module 115 traverses 740 the received decision tree using the feature vector until a leaf node is reached.

The security module 115 determines 750 whether the target file can be successfully classified as legitimate or malicious based on the classification represented by the leaf node, the associated confidence score, and optionally the local security policy. For example, if the confidence score is below a threshold value, then the security module 115 ignores the represented classification, and determines 750 that the target process is not successfully classified. If the target file is not successfully classified, the security module 115 continues to monitor 730 the runtime behavior of the target process and repeats steps 730-750 until a successful classification is reached. The security module 115 then determines 760 whether the target process is malicious based on the decision tree traversal, and either terminates the target process if it is determined malicious or leaves it alone if determined legitimate.

In one embodiment, if the target process forks into multiple threads, the security module 115 monitors and attempts to classify each thread. If one of the threads is determined malicious, then the security module 115 determines that the process is malicious and terminates all its threads. Otherwise, if all threads are determine legitimate, then the process is determined legitimate.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for constructing a decision tree that takes into account behavior or event sequencing and timing information. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for constructing a classifier for classifying computer files that takes into account behavior sequencing and timing information of the computer files, comprising:

monitoring runtime behavior of a training file of a known classification;

detecting a plurality of behavior events exhibited by the training file, the plurality of behavior events detected at ones of a plurality of points in time;

responsive to detecting the plurality of behavior events at ones of the plurality of points in time, identifying (1) an event sequence exhibited by the training file reflecting the runtime behavior at the ones of the plurality of points in time and (2) timing information indicating, for each of the plurality of behavior events, a time gap between a process launch of the training file and a point in time when the associated behavior event is detected;

generating, for each of the plurality of behavior events, a feature vector encoded with information related to the training file at the point in time the associated behavior event is detected, the related information comprising values of a predetermined set of file attributes, an exhibited event sequence, and timing information;

constructing a classifier based on the feature vectors and the known classification of the training file; and storing the classifier.

2. The method of claim 1, wherein each of the plurality of behavior events belongs to one of a plurality of event types, and wherein the feature vector associated with a behavior event comprises a feature for each of the plurality of event types, and wherein the value of a feature associated with an event type comprises the event type of a behavior event the training file exhibited before a behavior event of the associated event type.

3. The method of claim 2, wherein the plurality of event types comprise at least two of the following: file create, file write, file delete, registry modify, registry delete, process launch, process terminate, thread create, and thread terminate.

4. The method of claim 1, wherein each of the plurality of behavior events belongs to one of a plurality of event types, and wherein the feature vector associated with a behavior event comprises a feature for each of the plurality of event types, and wherein the value of a feature associated with a event type comprises a sequencing number of a behavior event of the associated event type.

5. The method of claim 1, wherein the training file comprises a plurality of threads, and wherein generating a feature vector comprises:
   generating, for each behavior event of each of the plurality of threads, a feature vector encoded with information related to the thread at a point in time the associated behavior event is detected, the related information comprising an event sequence exhibited by the thread and a time gap between a thread creation and the point in time.

6. The method of claim 1, wherein the known classification of the training files comprises legitimate file and malware, and wherein the classifier is a decision tree used by a client system to classify a file residing on the client system as legitimate or malware.

7. A computer system for constructing a classifier for classifying computer files that takes into account behavior sequencing and timing information of the computer files, comprising:
   a non-transitory computer-readable storage medium storing executable computer program code comprising:
      a feature determination module for monitoring runtime behavior of a training file of a known classification, detecting a plurality of behavior events exhibited by the training file, the plurality of behavior events detected at ones of a plurality of points in time, identifying (1) an event sequence exhibited by the training file reflecting the runtime behavior at the ones of the plurality of points in time and (2) timing information indicating, for each of the plurality of behavior events, a time gap between a process launch of the training file and a point in time when the associated behavior event is detected in response to detecting the plurality of behavior events at ones of the plurality of points in time, and generating, for each of the plurality of behavior events, a feature vector encoded with information related to the training file at the point in time the associated behavior event is detected, the related information comprising values of a predetermined set of file attributes, an exhibited event sequence, and timing information,
      a machine learning engine for constructing a classifier based on the feature vectors and the known classification of the training file, and
      a data store for storing the classifier; and
   a processor for executing the computer program code.

8. The computer system of claim 7, wherein each of the plurality of behavior events belongs to one of a plurality of event types, and wherein the feature vector associated with a behavior event comprises a feature for each of the plurality of event types, and wherein the value of a feature associated with an event type comprises the event type of a behavior event the training file exhibited before a behavior event of the associated event type.

9. The computer system of claim 8, wherein the plurality of event types comprise at least two of the following: file create, file write, file delete, registry modify, registry delete, process launch, process terminate, thread create, and thread terminate.

10. The computer system of claim 7, wherein each of the plurality of behavior events belongs to one of a plurality of event types, and wherein the feature vector associated with a behavior event comprises a feature for each of the plurality of event types, and wherein the value of a feature associated with a event type comprises a sequencing number of a behavior event of the associated event type.

11. The computer system of claim 7, wherein the training file comprises a plurality of threads, and wherein the feature determination module is further configured for generating, for each behavior event of each of the plurality of threads, a feature vector encoded with information related to the thread at a point in time the associated behavior event is detected, the related information comprising an event sequence exhibited by the thread and a time gap between a thread creation and the point in time.

12. The computer system of claim 7, wherein the known classification of the training files comprises legitimate file and malware, and wherein the classifier is a decision tree used by a client system to classify a file residing on the client system as legitimate or malware.

13. A non-transitory computer-readable storage medium encoded with executable computer program code for constructing a classifier for classifying computer files that takes into account behavior sequencing and timing information of the computer files, the computer program code comprising program code for:
   monitoring runtime behavior of a training file of a known classification;
   detecting a plurality of behavior events exhibited by the training file, the plurality of behavior events detected at ones of a plurality of points in time;
   responsive to detecting the plurality of behavior events at ones of the plurality of points in time, identifying (1) an event sequence exhibited by the training file reflecting the runtime behavior at the one of the plurality of points in time and (2) timing information indicating, for each of the plurality of behavior events, a time gap between a process launch of the training file and a point in time when the associated behavior event is detected;
   generating, for each of the plurality of behavior events, a feature vector encoded with information related to the training file at the point in time the associated behavior event is detected, the related information comprising values of a predetermined set of file attributes, an exhibited event sequence, and timing information;
   constructing a classifier based on the feature vectors and the known classification of the training file; and
   storing the classifier.

14. The non-transitory computer-readable storage medium of claim 13, wherein each of the plurality of behavior events belongs to one of a plurality of event types, and wherein the feature vector associated with a behavior event comprises a feature for each of the plurality of event types, and wherein the value of a feature associated with the event type comprises the event type of a behavior event the training file exhibited before a behavior event of the associated event type.

15. The non-transitory computer-readable storage medium of claim 14, wherein the plurality of event types comprise at least two of the following: file create, file write, file delete, registry modify, registry delete, process launch, process terminate, thread create, and thread terminate.

16. The non-transitory computer-readable storage medium of claim 13, wherein each of the plurality of behavior events belongs to one of a plurality of event types, and wherein the feature vector associated with a behavior event comprises a feature for each of the plurality of event types, and wherein the value of a feature associated with a event type comprises a sequencing number of a behavior event of the associated event type.

17. The non-transitory computer-readable storage medium of claim 13, wherein the known classification of the training files comprises legitimate file and malware, and wherein the classifier is a decision tree used by a client system to classify a file residing on the client system as legitimate or malware.

18. The computer-implemented method of claim 1, wherein the timing information further indicating a time gap between detection of at least one of the plurality of behavior events and of another one of the plurality of behavior events, the another one of the plurality of behavior events adjacent to the at least one of the plurality of behavior events.

19. The computer-implemented method of claim 1, further comprising:
- monitoring runtime behavior of a file of unknown classification;
- identifying an event sequence and timing information for the file of unknown classification; and
- using the classifier, classifying the file of unknown classification as legitimate or malicious based on the identified event sequence and timing information for the file.

* * * * *